US012330169B2

(12) United States Patent
Spithoven

(10) Patent No.: US 12,330,169 B2
(45) Date of Patent: Jun. 17, 2025

(54) DEVICE AND METHOD FOR SEPARATING ELONGATE MAGNETIZABLE OBJECTS BY LENGTH

(71) Applicant: J. Spithoven Beheer B.V., Eersel (NL)

(72) Inventor: Johannes Antonius Spithoven, Eersel (NL)

(73) Assignee: J. Spithoven Beheer B.V., Eersel (NL)

( * ) Notice: Subject to any disclaimer, the term of this patent is extended or adjusted under 35 U.S.C. 154(b) by 0 days.

(21) Appl. No.: 18/567,977

(22) PCT Filed: Jun. 10, 2022

(86) PCT No.: PCT/NL2022/050323

§ 371 (c)(1),
(2) Date: Dec. 7, 2023

(87) PCT Pub. No.: WO2022/260522

PCT Pub. Date: Dec. 15, 2022

(65) Prior Publication Data

US 2024/0261794 A1 Aug. 8, 2024

(30) Foreign Application Priority Data

Jun. 11, 2021 (NL) ........................................ 2028437

(51) Int. Cl.
*B03C 1/22* (2006.01)

(52) U.S. Cl.
CPC ............ *B03C 1/22* (2013.01); *B03C 2201/20* (2013.01); *B03C 2201/22* (2013.01)

(58) Field of Classification Search
CPC ... B03C 1/22; B03C 2201/20; B03C 2201/22; B03C 1/16; B03C 1/18; B03C 1/20
USPC .......................................................... 209/212
See application file for complete search history.

(56) References Cited

U.S. PATENT DOCUMENTS 4,125,191 A 11/1978 Peace
5,887,728 A * 3/1999 Muranaka ................. B03C 1/10 209/225
6,364,117 B1 * 4/2002 Takano ..................... B03C 1/16 209/636

FOREIGN PATENT DOCUMENTS

CN 207086104 U 3/2018
DE 183325 C 7/1906
ES 8400038 A1 11/1983

* cited by examiner

*Primary Examiner* — Michael McCullough
*Assistant Examiner* — Jessica L Burkman
(74) *Attorney, Agent, or Firm* — The Webb Law Firm

(57) ABSTRACT

The invention relates to a device for separating elongate magnetizable objects from a material stream by length. The device includes a magnetic field, which magnetic field is homogeneous in a field zone; a transport device with a transport surface for carrying the material stream through the field zone in a transport direction, wherein the field direction in the field zone is oriented at right angles to the transport direction; and a separating device for carrying the elongate magnetizable objects separated by length out of the field zone in a separation direction, which separating device includes at least one take-up element which travels a path running at least partially through the field zone. In the path in the field zone the minimum distance between the at least one take-up element and the transport surface is a first distance which is smaller than or equal to the greatest main dimension of a cross-section of the field zone parallel to the transport surface. The invention also relates to a method for separating elongate magnetizable objects from a material stream by length.

15 Claims, 2 Drawing Sheets

DEVICE AND METHOD FOR SEPARATING ELONGATE MAGNETIZABLE OBJECTS BY LENGTH

CROSS-REFERENCE TO RELATED APPLICATIONS

This application is the United States national phase of International Patent Application No. PCT/NL2022/050323 filed Jun. 10, 2022, and claims priority to The Netherlands Patent Application No. 2028437 filed Jun. 11, 2021, the disclosures of which are hereby incorporated by reference in their entireties.

BACKGROUND OF THE INVENTION

Field of the Invention

The invention relates to a device for separating elongate magnetizable objects from a material stream by length. The invention also relates to a method for separating elongate magnetizable objects from a material stream by length.

Description of Related Art

In the recycling of car tyres, for example, one of the resulting monostreams consists of steel from the carcass of the car tyre. The recycling process, in which the car tyre is shredded and/or granulated, then creates elongate chips or shreds of varying lengths and diameters. Classification makes the fibres into more valuable raw materials. The longer chips are valuable raw materials for other manufacturing processes, for instance as reinforcement. The small chips are melted down before they can be reused. In order to separate the longer chips from the shorter chips, it is known to make use of a screening device. A drawback of an existing screening device is that, because the elongate chips have a relatively small size, a large part of the elongate chips will still pass through the meshes of the screen, which is undesirable. It is hereby difficult to refine the monostream into a high-quality monostream of chips of a determined length.

SUMMARY OF THE INVENTION

It is now an object of the invention to reduce or even obviate the above stated drawback. It is a particular object of the invention to provide a device whereby elongate magnetizable objects can be separated from a material stream.

This object is achieved according to the invention with a device for separating elongate magnetizable objects from a material stream by length, which device comprises:

- a magnetic field, which magnetic field is homogeneous in a field zone;
- a transport device with a transport surface for carrying the material stream through the field zone in a transport direction, wherein the field direction in the field zone is oriented at right angles to the transport direction;
- a separating device for carrying the elongate magnetizable objects separated by length out of the field zone in a separation direction, which separating device comprises at least one take-up element which travels a path running at least partially through the field zone, wherein in the path in the field zone the minimum distance between the at least one take-up element and the transport surface is a first distance which is smaller than or equal to the greatest main dimension of a cross-section of the field zone parallel to the transport surface.

The device according to the invention makes use of a magnetic field with a field zone wherein the magnetic field is homogenous. In a homogenous magnetic field the strength of the field is equal throughout and has the same direction throughout. It is important for the invention that the magnetic field in the field zone is substantially homogeneous. There need not be a perfectly homogenous field, and some bending close to the edges of the field zone does not impede the operation of the device. An adequate dimensioning and corresponding volume of the field zone can be determined for a determined separation length in simple manner by the skilled person.

By providing the device with a transport device, the material stream in which the elongate magnetizable objects are present can be carried through the field zone. The transport surface can for instance be formed by a conveyor belt. The transport device can optionally be provided with equipment for obtaining a homogenous distribution of the magnetizable objects on the transport surface, so that as little layering as possible occurs in the material stream. If there is layering, and the elongate magnetizable objects therefore (partially) overlap, there is a risk that when the elongate magnetizable objects are upended from the material stream, two overlapping objects are upended in line with each other, which is undesirable, by the magnetic field, making the separation on the basis of length less accurate.

In order to prevent overlapping objects, the material stream can also be arranged on the transport surface in the field zone, wherein the material stream can align with the field direction before coming to lie on the transport surface.

The material stream can also be demagnetized before being carried into the field zone in order to guarantee that the material stream is free from magnetized materials which could cause an undesirable disruption of the magnetic field in the field zone.

By providing a separating device the elongate magnetizable objects to be separated by length can be discharged from the material stream. For this purpose the separating device carries the separated elongate magnetizable objects in a separation direction.

The device according to the invention makes effective use of the effect that, in a magnetic field, elongate magnetizable objects align with this field in the longitudinal direction owing to the torque acting on the objects due to the magnetic field. Because the field direction in the field zone is oriented at right angles to the transport surface and is also homogeneous in the field zone, the elongate magnetizable objects in the material stream in the field zone will therefore come to lie substantially at right angles relative to the transport surface. This applies particularly to elongate magnetizable objects with a length smaller than or equal to the smallest main dimension of a cross-section of the field zone parallel to the transport surface. When the elongate magnetizable object is substantially longer than said greatest main dimension, the object will not be upended by the magnetic field.

Because the separating device carries at least one take-up element through the field zone where the elongate magnetizable objects are aligned with the field direction, the longest objects can be picked up in simple manner by means of the at least one take-up element. Once it has been picked up, the object can then be discharged in the separation direction. A plurality of take-up elements is preferably arranged, for instance on an endless conveyor belt. The at least one take-up element can for instance take up the objects for separating in mechanical manner.

Because the minimum distance to the transport surface, and thereby to the material stream situated thereon as well, is smaller than the greatest main dimension of a cross-section of the field zone parallel to the transport surface, the objects upended by this field can be taken up in simple manner for discharge in the separation direction. Objects which are substantially longer than the greatest main dimension of the field zone are not upended effectively, or even not upended at all, by the magnetic field in the field zone. The minimum, i.e. first, distance is preferably measured parallel to the field direction. The field zone preferably extends at least from the transport surface to the first distance from the transport surface.

The greatest main dimension of a cross-section of the field zone parallel to the transport surface is preferably placed at right angles to the transport direction. When a main dimension of a cross-section of the field zone in the transport direction and parallel to the transport surface is smaller than the first distance, the upending effect acting on the material stream because of the bending field lines at the edge of the field zone is important for being able to guarantee that the elongate magnetizable objects are wholly upended when, in the field zone, they reach the position along the path where the at least one take-up element lies at the minimum distance to the transport surface.

For application of the device according to the invention the field strength and transport speed must be adapted depending on the material and the shape of the elongate magnetizable objects for separating. These parameters can be determined by the skilled person in simple manner without further inventive activity.

In another embodiment of a device according to the invention the first distance is smaller than or equal to the smallest main dimension of a cross-section of the field zone parallel to the transport surface.

By selecting a first distance which is not only smaller than the greatest main dimension of a cross-section of the field zone parallel to the transport surface, but also smaller than the smallest main dimension of this cross-section, an elongate magnetizable object for separating will be able to be upended by the torque acting on the object in the field zone, irrespective of any possible effect of the bending field lines which have acted on the object before the start of the field zone, as seen in the transport direction.

Another embodiment of a device according to the invention is a device wherein the separation direction diverges from the transport direction.

The separation between the material stream and the elongate magnetizable objects selected by length can take place on the basis of a transport and separation direction running parallel, wherein the transport surface ends outside the field zone before the separation direction ends. In cases in which it is preferable for the transport surface to continue for optional further processing steps, it is desirable to have the separation direction diverge relative to the transport direction.

In a preferred embodiment of the device according to the invention the at least one take-up element is magnetic or magnetizable.

By making the at least one take-up element magnetic or magnetizable a mechanically very simple and robust separating device is obtained. The take-up element need not be provided with a mechanical gripper or similar mechanical construction. The at least one take-up element causes a disruption of the magnetic field in the field zone, whereby an upended elongate magnetizable object with a length in the order of magnitude of the first distance is magnetically coupled to the at least one take-up element so it can be carried out of the field zone. When a take-up element enters the vicinity of an upended elongate magnetizable object, the equilibrium of forces shifts due to the disruption of the magnetic field caused by the take-up element. The take-up element will hereby start attracting the object. This effect can also occur at some distance, whereby the object can come away from the transport surface and couple magnetically to the take-up element.

For the separation of magnetizable objects with a high magnetic permeability effective use can be made of a magnetizable take-up element. For objects with a low magnetic permeability a magnetic take-up element is preferably applied for the purpose of obtaining a magnetic coupling whereby the object can be separated from the material stream.

Use can be made of permanent magnets, but also of electromagnets. When magnetizable take-up elements are used, they can optionally be demagnetized before being introduced into the field zone, so that any remaining magnetization of the at least one take-up element causes a predictable disruption of the magnetic field in the field zone.

Another embodiment of a device according to the invention is a device wherein the at least one take-up element is elongate.

An elongate take-up element can be aligned with the field direction at the minimal distance in simple manner in the field zone, so that the take-up element comes to lie in line with the upended elongate magnetizable objects.

In an embodiment of a device according to the invention the field direction, transport direction and separation direction lie in one plane.

By aligning the field, transport and separation direction in one plane the elongate magnetizable objects taken up by length will be subjected to little or no lateral movement relative to the transport direction. This reduces the chances of a taken-up object interfering or colliding along the travelled path with another elongate magnetizable object upended on the transport surface.

Also according to the invention is an embodiment of a device wherein the magnetic field in the field zone is generated by a magnet arranged under the transport surface, preferably exclusively by a magnet arranged under the transport surface.

A homogeneous magnetic field suitable for the operation according to the invention can be generated well by arranging a pole of a magnet under the transport surface. Such a magnet can be a permanent magnet, but an electromagnet is also highly suitable. For a stronger and more homogeneous field a magnet can optionally also be arranged above the transport surface. Use can optionally also be made of a yoke, for instance in a C-configuration.

Because the field is also roughly homogeneous at some distance from the edges of the surface of a magnet pole, a pole is preferably only arranged under the transport surface. An opposite pole need not therefore be arranged above the transport surface to obtain a homogeneous magnetic field suitable for the operation according to the invention. The construction can hereby be kept very simple.

In yet another embodiment of a device according to the invention the speed of the transport surface corresponds in the field zone with the component of velocity in the transport direction of the at least one take-up element.

By having the component in transport direction of the speed of the at least one take-up element correspond with the speed of the transport surface no relative displacement of the object occurs for the taken-up objects as seen from the transport surface. This minimizes the chances of the taken-up object interfering or colliding with another elongate magnetizable object upended on the transport surface.

Also according to the invention is an embodiment of a device wherein the separating device also comprises an ejector magnetic field for releasing the elongate magnetizable objects separated by length from the at least one take-up element, wherein the field direction of the ejector magnetic field has a different orientation relative to the field direction of the magnetic field in the field zone and is preferably opposite to the field direction of the magnetic field in the field zone.

The elongate magnetizable objects separated by length can be released from the at least one take-up element in different ways, such as for instance mechanically or pneumatically. An optionally alternating magnetic field with a different orientation is preferably arranged in the separation direction, whereby the elongate magnetizable objects separated by length can be released from the at least one take-up element in simple manner by the effect of the opposite pole of the ejector magnetic field.

When the at least one take-up element is magnetic and the magnetic field in question is generated electromagnetically, the magnetic field of the at least one take-up element can also be reversed for the purpose of generating the ejector magnetic field. Alternatively, the magnetic field can also be applied in alternating and attenuating manner so that the taken-up object is demagnetized and thereby comes loose from the take-up element.

The invention also relates to a method for separating elongate magnetizable objects from a material stream by length, comprising the steps of:

- applying a magnetic field, which magnetic field is homogeneous in a field zone;
- carrying the material stream through the field zone in a transport direction, wherein the field direction in the field zone is oriented at right angles to the transport direction;
- arranging at least one take-up element in the field zone at a first distance to the material stream, which first distance is smaller than the smallest main dimension of a cross-section of the field zone parallel to the transport direction and the material stream;
- carrying the elongate magnetizable objects separated by length out of the field zone in a separation direction.

A characteristic advantage of the method according to the invention is that the method makes effective use of the effect that, in a homogeneous magnetic field, elongate magnetizable objects align in the longitudinal direction with that field, as already described in respect of an embodiment of the device according to the invention.

In a preferred embodiment of the method according to the invention the method is performed with a device according to the invention.

The at least one take-up element is here preferably magnetic or magnetizable, wherein the elongate magnetizable objects separated by length are taken up magnetically so that no complex mechanical take-up element need be provided. The elongate magnetizable objects separated by length are then according to the method not taken up with for instance a mechanical gripping action, but on the basis of a magnetic coupling between the take-up element and the object.

Also according to the invention is an embodiment of a method which also comprises the step of releasing the elongate magnetizable objects separated by length from the at least one take-up element by means of an ejector magnetic field, wherein the field direction of the ejector magnetic field has a different orientation relative to the field direction of the magnetic field in the field zone.

By using an ejector magnetic field for releasing the taken-up object from the at least one take-up element a very simple and robust separating device is obtained, since no mechanical or pneumatic releasing device need be provided.

BRIEF DESCRIPTION OF THE DRAWINGS

These and other features of the invention are further elucidated with reference to the accompanying drawings.

The terms Fig., Figs., Figure, and Figures are used interchangeably in the specification to refer to the corresponding figures in the drawings.

DESCRIPTION OF THE INVENTION

Figure 1:
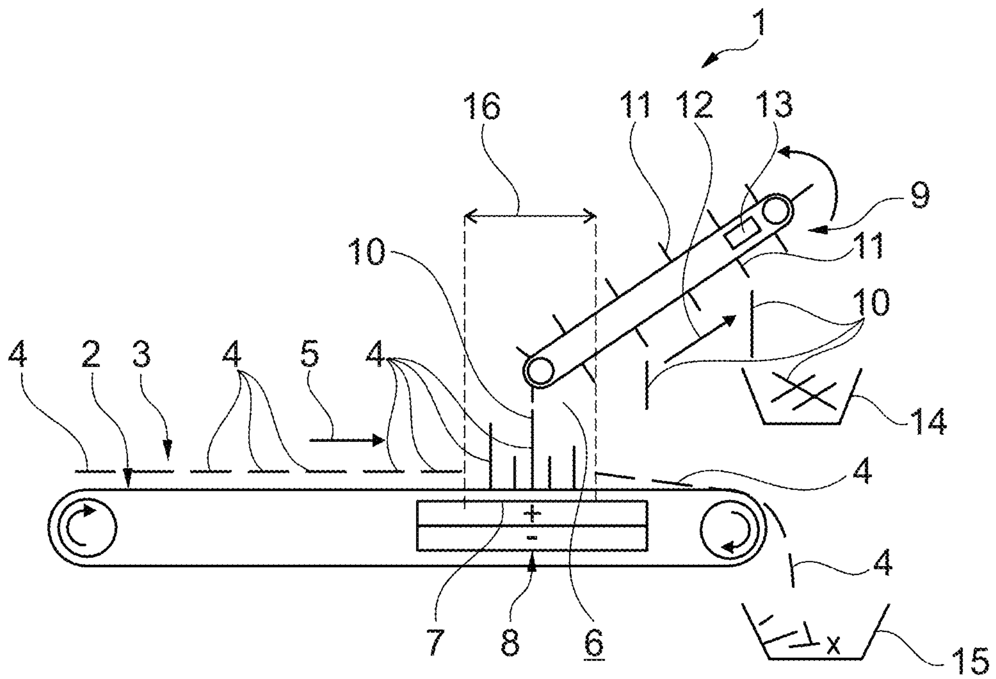
FIG. 1 shows a schematic representation of a device according to the invention.

FIG. 1 shows a schematic representation of a device 1 according to the invention. A material stream 3 of elongate magnetizable objects 4 is arranged on transport surface 2 of the transport device. The objects 4 are carried in transport direction 5 into the field zone 6, where a homogeneous magnetic field has been applied. The magnetic field is generated by a magnet pole 7 of a magnet 8 arranged under transport surface 2. In field zone 6 the field direction of the homogeneous magnetic field is oriented at right angles to transport surface 2. The separating device 9 carries elongate magnetic object 10 separated by length out of the field zone 6. The objects 10 separated by length are taken up in the field zone of transport surface 2 by means of elongate take-up elements 11 and discharged in the separation direction 12. An ejector magnet 13 generates an opposite field for releasing the objects 10 from the take-up elements 11 into receptacle 14. The remaining, shorter object 4 are cleared from transport surface 2 at the end of the transport device and collected in a second receptacle 15. The smallest main dimension 16 of a cross-section of field zone 6 parallel to transport surface 2 is greater than the length of the objects 10 to be separated.

Figure 2:
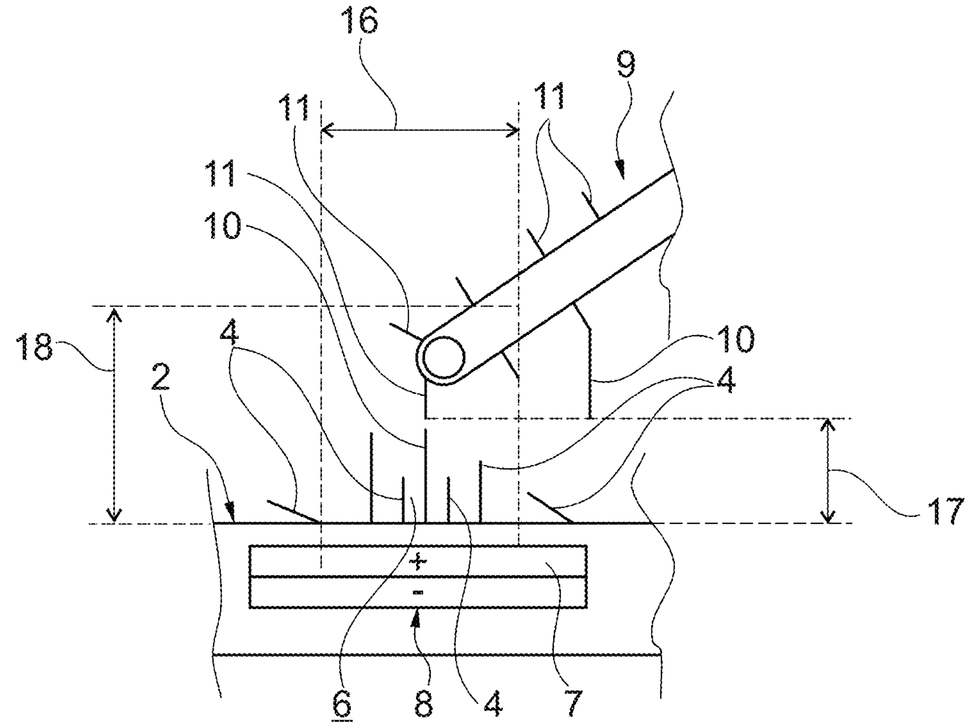
FIG. 2 shows a detail of the representation of FIG. 1.

FIG. 2 shows a detail of the representation of FIG. 1. The smallest main dimension 16 of a cross-section of field zone 6 parallel to transport surface 2 is greater than the length of the objects 10 to be separated. In the path of the take-up elements 11, which runs partially through field zone 6, the first distance 17 is the minimum distance between take-up elements 11 and transport surface 2. This first distance 17 is smaller than the smallest main dimension 16 of a cross-section of field zone 6 parallel to transport surface 2. This first distance 17 is also smaller than or equal to a greatest main dimension 18 of a cross-section of the field zone 6 parallel to the transport surface 2.

Figure 3:
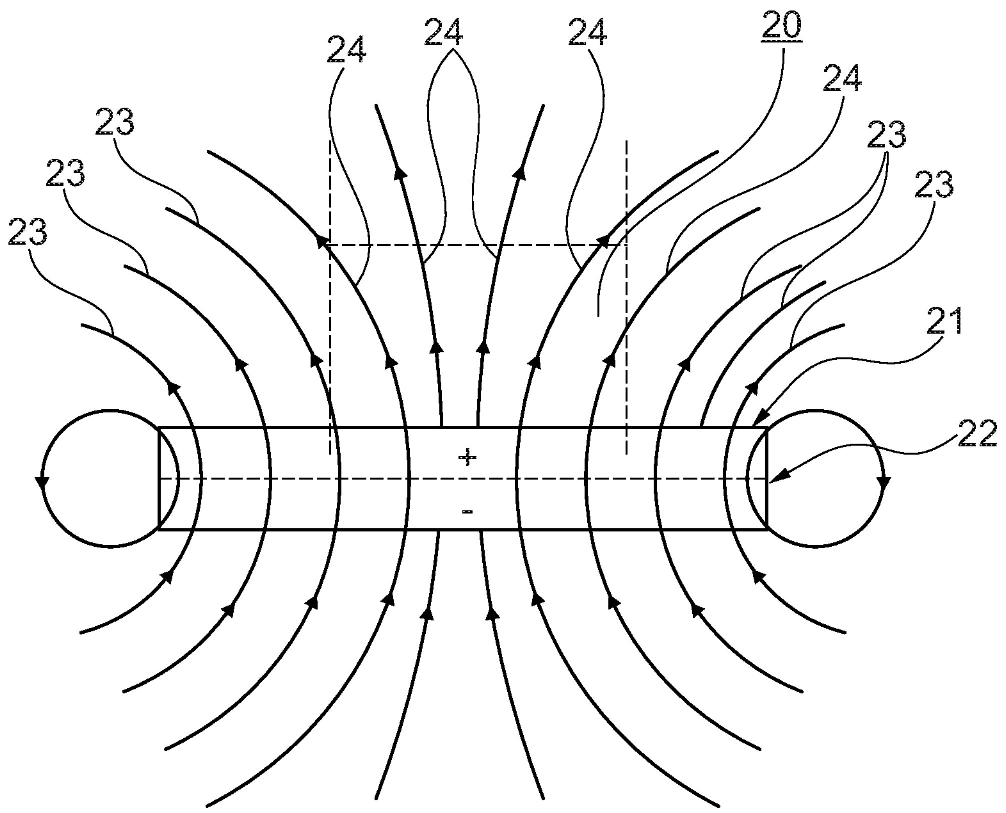
FIG. 3 shows a schematic representation of a homogeneous field zone close to the pole of a magnet.

FIG. 3 shows a schematic representation of a homogeneous field zone 20 close to the pole 21 of a magnet 22. Although the field lines 23 close to the edges of magnet 22 bend sharply, the field lines 24 which are further removed from the edges and cross the field zone 20 are roughly parallel, resulting in a homogenous field in field zone 20, as required for application of the invention.

The invention claimed is:

1. A device for separating elongate magnetizable objects from a material stream by length, which device comprises:
- a magnetic field, which magnetic field is homogeneous in a field zone;
- a transport device with a transport surface for carrying the material stream through the field zone in a transport direction, wherein the field direction in the field zone is oriented at right angles to the transport direction; and
- a separating device for carrying the elongate magnetizable objects separated by length out of the field zone in a separation direction, which separating device comprises at least one take-up element which travels a path running at least partially through the field zone, wherein in the path in the field zone the minimum distance between the at least one take-up element and the transport surface is a first distance which is smaller than or equal to a greatest main dimension of a cross-section of the field zone parallel to the transport surface.

2. The device according to claim 1, wherein the first distance is smaller than or equal to the smallest main dimension of a cross-section of the field zone parallel to the transport surface.

3. The device according to claim 1, wherein the separation direction diverges from the transport direction.

4. The device according to claim 1, wherein the at least one take-up element is magnetic or magnetizable.

5. The device according to claim 1, wherein the at least one take-up element is elongate.

6. The device according to claim 1, wherein the field direction, transport direction and separation direction lie in one plane.

7. The device according to claim 1, wherein the magnetic field in the field zone is generated by a magnet arranged under the transport surface.

8. The device according to claim 7, wherein the magnetic field in the field zone is generated exclusively by the magnet arranged under the transport surface.

9. The device according to claim 1, wherein the speed of the transport surface corresponds in the field zone with the component of velocity in the transport direction of the at least one take-up element.

10. The device according to claim 1, wherein the separating device also comprises an ejector magnetic field for releasing the elongate magnetizable objects separated by length from the at least one take-up element, wherein the field direction of the ejector magnetic field has a different orientation relative to the field direction of the magnetic field in the field zone.

11. The device according to claim 10, wherein the field direction of the ejector magnetic is opposite to the field direction of the magnetic field in the field zone.

12. A method for separating elongate magnetizable objects from a material stream by length, comprising the steps of:
- applying a magnetic field, which magnetic field is homogeneous in a field zone;
- carrying the material stream through the field zone in a transport direction, wherein the field direction in the field zone is oriented at right angles to the transport direction;
- arranging at least one take-up element in the field zone at a first distance to the material stream, which first distance is smaller than the smallest main dimension of a cross-section of the field zone parallel to the transport direction and the material stream; and
- carrying the elongate magnetizable objects separated by length out of the field zone in a separation direction.

13. The method according to claim 12 with a device comprising:
- a magnetic field, which magnetic field is homogeneous in a field zone;
- a transport device with a transport surface for carrying the material stream through the field zone in a transport direction, wherein the field direction in the field zone is oriented at right angles to the transport direction; and
- a separating device for carrying the elongate magnetizable objects separated by length out of the field zone in a separation direction, which separating device comprises at least one take-up element which travels a path running at least partially through the field zone, wherein in the path in the field zone the minimum distance between the at least one take-up element and the transport surface is a first distance which is smaller than or equal to a greatest main dimension of a cross-section of the field zone parallel to the transport surface.

14. The method according to claim 12, wherein the at least one take-up element is magnetic or magnetizable, wherein the elongate magnetizable objects separated by length are taken up magnetically.

15. The method according to claim 12, also comprising the step of releasing the elongate magnetizable objects separated by length from the at least one take-up element by means of an ejector magnetic field, wherein the field direction of the ejector magnetic field has a different orientation relative to the field direction of the magnetic field in the field zone.

* * * * *